(12) United States Patent
Harada et al.

(10) Patent No.: US 7,889,116 B2
(45) Date of Patent: Feb. 15, 2011

(54) OBJECT DETECTING APPARATUS

(75) Inventors: Tomoaki Harada, Susono (JP); Hisashi Satonaka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 117 days.

(21) Appl. No.: 12/281,436

(22) PCT Filed: Feb. 28, 2007

(86) PCT No.: PCT/JP2007/054364
§ 371 (c)(1),
(2), (4) Date: Sep. 2, 2008

(87) PCT Pub. No.: WO2007/102520
PCT Pub. Date: Sep. 13, 2007

(65) Prior Publication Data
US 2009/0040094 A1 Feb. 12, 2009

(30) Foreign Application Priority Data
Mar. 1, 2006 (JP) .............................. 2006-055399

(51) Int. Cl.
*G01S 13/87* (2006.01)
*G01S 13/93* (2006.01)
(52) U.S. Cl. ...................... 342/59; 342/70; 701/301
(58) Field of Classification Search ............... 342/59
See application file for complete search history.

(56) References Cited

U.S. PATENT DOCUMENTS

| 5,448,244 | A | * | 9/1995 | Komatsu et al. | ............ 342/155 |
| 5,945,939 | A | * | 8/1999 | Iihoshi | ............ 342/70 |
| 6,522,288 | B1 | * | 2/2003 | Paradie et al. | ............ 342/145 |
| 6,727,844 | B1 | * | 4/2004 | Zimmermann et al. | ....... 342/70 |
| 6,771,208 | B2 | * | 8/2004 | Lutter et al. | ............ 342/52 |
| 6,873,251 | B2 | * | 3/2005 | Schiffmann et al. | ......... 340/436 |
| 7,275,431 | B2 | * | 10/2007 | Zimmermann et al. | ....... 73/510 |
| 7,369,941 | B2 | * | 5/2008 | Schiffmann et al. | ......... 701/301 |
| 2006/0139204 | A1 | | 6/2006 | Abe et al. | |
| 2006/0238405 | A1 | * | 10/2006 | Wakayama et al. | .......... 342/79 |

FOREIGN PATENT DOCUMENTS

| JP | 58 208680 | 12/1983 |
| JP | 60 102579 | 6/1985 |
| JP | 64 35391 | 2/1989 |
| JP | 4 208891 | 7/1992 |
| JP | 8 75437 | 3/1996 |
| JP | 8 285940 | 11/1996 |

(Continued)

*Primary Examiner*—Thomas H Tarcza
*Assistant Examiner*—Matthew M Barker
(74) *Attorney, Agent, or Firm*—Oblon, Spivak, McClelland, Maier & Neustadt, L.L.P.

(57) ABSTRACT

An object detecting apparatus for detecting an object by a plurality of radars, with improved accuracy of identity determination and acquisition of position information in fusion of detection results. The object detecting apparatus is arranged to obtain a moving path of a detected point by a radar and to perform pairing as follows: if a detected point by a radar exists in a region based on the moving path and if a relative velocity thereof is matched with that of the detected point of interest, the detected point is paired as a corresponding detected point.

8 Claims, 16 Drawing Sheets

FOREIGN PATENT DOCUMENTS

| | | |
|---|---|---|
| JP | 2000 284049 | 10/2000 |
| JP | 2001 273596 | 10/2001 |
| JP | 2002 99907 | 4/2002 |
| JP | 2003 252147 | 9/2003 |
| JP | 2005 84034 | 3/2005 |
| JP | 2005 84035 | 3/2005 |
| JP | 2005-172590 | 6/2005 |
| JP | 2006 46962 | 2/2006 |

* cited by examiner

OBJECT DETECTING APPARATUS

TECHNICAL FIELD

The present invention relates to apparatus for detecting an object by radars and, more particularly, to an object detecting apparatus capable of detecting an object in a wider region by partial overlap of detection regions.

BACKGROUND ART

There is a known system for detecting an obstacle around a vehicle, a preceding vehicle, or the like by means of radars. There is also another known system for detecting an obstacle or the like by a combination of a radar with an image recognition unit. These systems for recognizing an obstacle by the combination of the radar with the image recognition unit or by the combination of radars need to perform a process of determining the identity of objects on the occasion of fusion of detection results in the respective detecting devices.

The technology described in Japanese Patent Application Laid-open No. 2003-168197 (Patent Document 1) concerns the fusion of detection results in the system for detecting an object by the radar and the image recognition unit, and the system is arranged to make a decision of "being an identical object" when distances to a detected object, relative velocities, and directions by the radar and the image recognition unit are determined to be equal.

DISCLOSURE OF THE INVENTION

For example, let us suppose a case of detection of another vehicle. The image recognition unit recognizes a vehicle image in an acquired picture and detects a position thereof. Therefore, it is able to detect the position including a region occupied by the vehicle. In contrast to it, the radar performs recognition based on a reflected wave from the other vehicle and thus can simply recognize a position of part of the vehicle. Therefore, the position of part varies depending upon a positional relation between the other vehicle and the host vehicle. For this reason, if a plurality of radars are used to detect an identical other vehicle, the radars might detect positions of different portions of the other vehicle, which can give rise to difference in detected positions and moving directions. The above-described technology of Patent Document 1 can make a decision of "not being an identical object" in such cases.

If an originally identical object is recognized as two different objects in this manner, there will arise the following problem, for example, in a case where a control is performed while tracking another object: the object under tracking is lost to cause a delay of the control, to fail to perform the originally intended control, or to perform a control that should not be originally carried out to the contrary. Furthermore, there is also a possibility that only one radar provides an output in a mutually overlapping region of detection regions, so as to make a decision of detection error and lose an originally existing obstacle.

An object of the present invention is therefore to provide an object detecting apparatus for detecting an object by a plurality of radars, with improved accuracy of identity determination and acquisition of position information in fusion of detection results.

For accomplishing the above object, an object detecting apparatus according to the present invention comprises first detecting means for receiving a reflected wave from an object as reflection of a transmitted wave sent out, to detect a position of the object; second detecting means arranged so that a detection region thereof overlaps in part with a detection region of the first detecting means, and adapted for receiving a reflected wave from an object as reflection of a transmitted wave sent out, to detect a position of the object; and identity determining means for setting a range for a moving path of the object, based on the position of the object detected by one of the first and second detecting means, and for, when the position of the object detected by the other of the first and second detecting means is included in the range, determining that the object detected by the first detecting means is identical with the object detected by the second detecting means.

Each of the first detecting means and the second detecting means is a radar for sending out a transmitted wave to an object and for detecting a reflected wave from the object to determine the presence/absence of the object and the position, velocity, etc. thereof. In fusion of detection results by a plurality of radars with their respective detection regions overlapping in part, a special problem arises from a target object traveling from a detection region of one detecting means to a detection region of another detecting means. For example, let us consider a target object moving from the detection region of the first detecting means to the detection region of the second detecting means. This target object is first detected by only the first detecting means. When a part of the target object goes into the detection region of the second detecting means, it is detected by both of the first and second detecting means. Then this state continues until the entire target object leaves the detection region of the first detecting means. After the point of the leaving, the target object is detected by only the second detecting means. When the target object is located over the detection region of the first detecting means and the detection region of the second detecting means as in this case, the first detecting means and the second detecting means can detect different locations, for example, because of a difference between detectable portions of the target object by the first detecting means and the second detecting means. This leads to a difference in detected positions and others of the target object.

The object detecting apparatus according to the present invention is arranged to determine an estimated movement direction of the object, based on the position information or the like of the object under previously continuous detection of the target object. In a case where one detecting means continuously detects the target object, it is considered that a specific part of the detection target object is continuously detected and that the moving direction information is also determined with accuracy. When the position detected by the other detecting means is included in the predetermined range set based on this estimated movement direction, the objects are determined to be identical, whereby accurate pairing of detected positions can be implemented even in cases where the detected positions are apart from each other.

It is preferable herein that the range set for the moving path of the object, based on the position of the object, be a region within a predetermined width from an estimated movement locus of the object, in the vicinity of a border position of the detection region on the other detecting means side.

At a stage when an object continuously detected by one detecting means of interest starts to move into the detection region of the other detecting means, the entire object is considered to stay in the detection area of the detecting means of interest, and the estimated movement locus is also highly reliable. An object detected as if to move from the border region within the predetermined width from the estimated movement locus into the detection region of the other detecting means is determined to be a moving object on the estimated locus.

Another object detecting apparatus according to the present invention comprises first detecting means for receiving a reflected wave from an object as reflection of a transmitted wave sent out, to detect a position of the object; second detecting means arranged so that a detection region thereof overlaps in part with a detection region of the first detecting means, and adapted for receiving a reflected wave from an object as reflection of a transmitted wave sent out, to detect a position of the object; pairing means for performing pairing of detection results of the first detecting means and the second detecting means; and selecting means for selecting as an object position an object position more distant from a border position of the detecting means of interest, among object positions paired by the pairing means.

If object positions paired in fusion are not approximately equal but apart from each other, there will arise a problem of which should be adopted as an object detected position. The object detecting apparatus according to the present invention is arranged to select as an object position the object position more distant from the border position of the detecting means of interest, among the paired object positions. As the distance increases from the border position of the detecting means of interest, a larger number of portions of the object as a target are assumed to be located within the detection region of the detecting means, and the position accuracy becomes higher. On the other hand, when the object position is detected near the border position, most of the object as a target can be located outside the detection region and detected portions of the object can vary in such cases.

The first detecting means and the second detecting means are arranged to output as an object position a position where the reflected wave from the object has a maximum reflection intensity. When the object is a vehicle, reflection is normally often strongest from a wheel house on its sides and from a license plate on the front and back.

The present invention, as described above, enables appropriate pairing even in cases where an object is detected by a plurality of radars and where positions detected by the respective radars are apart from each other. For this reason, the object can be appropriately tracked while the object is moving from a detection region of a certain radar to a detection region of another radar; therefore, accuracy of control or processing is also improved in various controls and processes using the detection results.

While an object moves into a detection region, variation in detected part of the object can bring about such a behavior that the object seems as if it is at a standstill near a border of the detection region. When the determination in the moving-in mode is carried out based on the estimated movement locus, this kind of stay can be discriminated and it becomes feasible to make an accurate determination of the object position and moving state.

When the apparatus is arranged to select as an object position a position farther from a border position on the other object detection region side in the detection region of interest, among paired object positions, it becomes easier to track a specific portion.

When the object position is determined to be the position where the reflected wave from the object has the strongest reflection intensity, it becomes easier to perform processing and to discriminate a signal from noise.

BEST MODE FOR CARRYING OUT THE INVENTION

Figure 1:
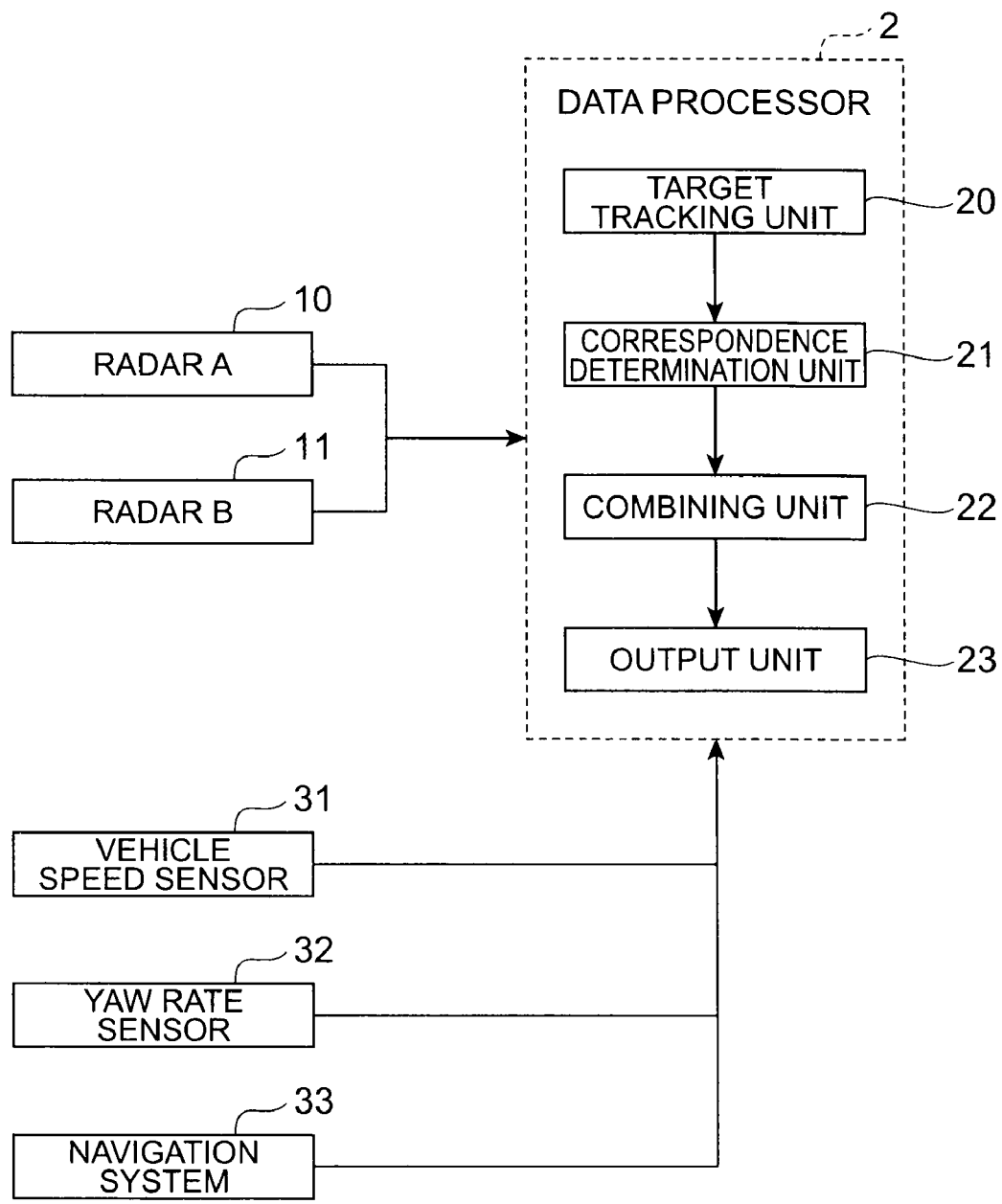
FIG. 1 is a block diagram showing a schematic configuration of an object detecting apparatus according to the present invention.

Preferred embodiments of the present invention will be described below in detail with reference to the accompanying drawings. For easier understanding of description, the same constituent elements will be denoted by the same reference symbols in the drawings as much as possible, without redundant description.

Figure 2:
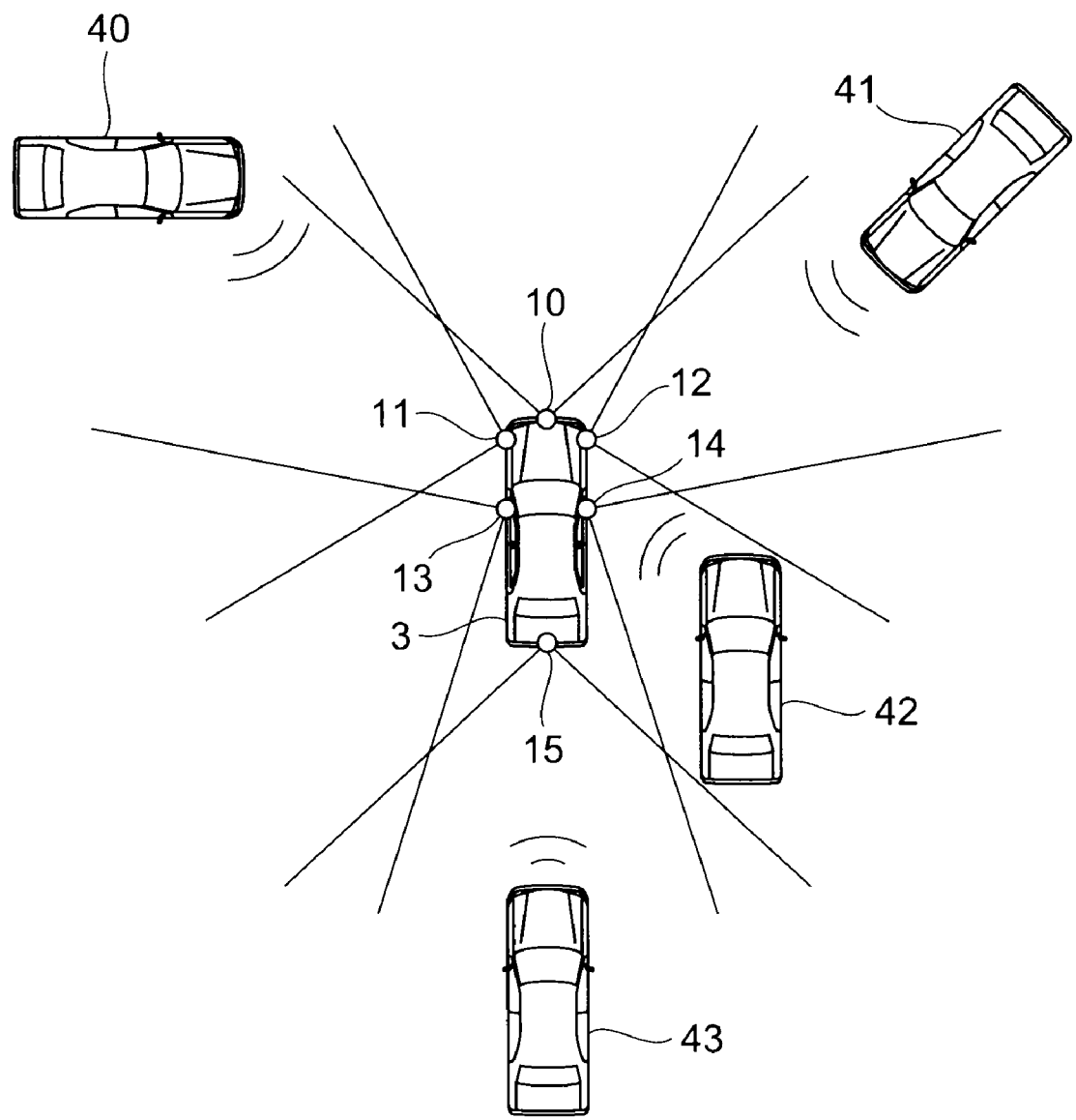
FIG. 2 is a drawing showing an example of mounting radars 10-15 on a vehicle 3, and detection regions thereof.

FIG. 1 is a block diagram showing a schematic configuration of an object detecting apparatus according to the present invention. This object detecting apparatus is mounted on a vehicle and designed to detect an obstacle or the like around the vehicle by means of a plurality of radars. FIG. 1 shows only two radars as a radar A10 and a radar B11 for simplicity, but the apparatus may be equipped with two or more radars. FIG. 2 shows an example of mounting radars 10-15 on a vehicle 3, and detection regions thereof.

Outputs from the respective radars A10 and B11 are transmitted to a data processing section 2. This data processing section 2 is composed of a CPU, a ROM, a RAM, etc. and consists of a target tracking unit 20 for tracking an object, based on detection results of the radar A10 and the radar B11, a correspondence determining unit 21 for determining a correspondence between the detection results in order to implement fusion of processing results of the radar A10 and the radar B11, a combining unit 22 for combining the detection results, and an output unit 23 for outputting a detection result. The components may be composed of separate hardware elements, but part or the whole of hardware may be shared to implement the functions of the respective components on a software basis. In this case, it is sufficient that the functions according to the respective components be implemented, and it is not necessary that each component be an independent software program. The target tracking unit 20 may be incorporated in each of the radar A10 and the radar B11.

The data processing section 2 further receives outputs from other devices including a vehicle speed sensor 31 for detecting a vehicle speed, a yaw rate sensor 32 for detecting a yaw rate acting on the vehicle, and a navigation system 33 for acquiring a current position of the vehicle, topographic information around the vehicle, and so on.

For detecting the circumstances throughout the entire circumference of the vehicle 3, for example as shown in FIG. 2, a total of six radars 10-15 are arranged in the front and rear parts of the vehicle and in the front and center parts on the left and right sides. This configuration allows the radars to detect other vehicles 40, 41 whose moving path crosses that of the vehicle 3, a parallel-running vehicle 42, a following vehicle 43, and so on. Although not shown, other detection targets include a preceding vehicle, a bicycle, a pedestrian, etc., and even obstacles and others at rest.

Figure 3:
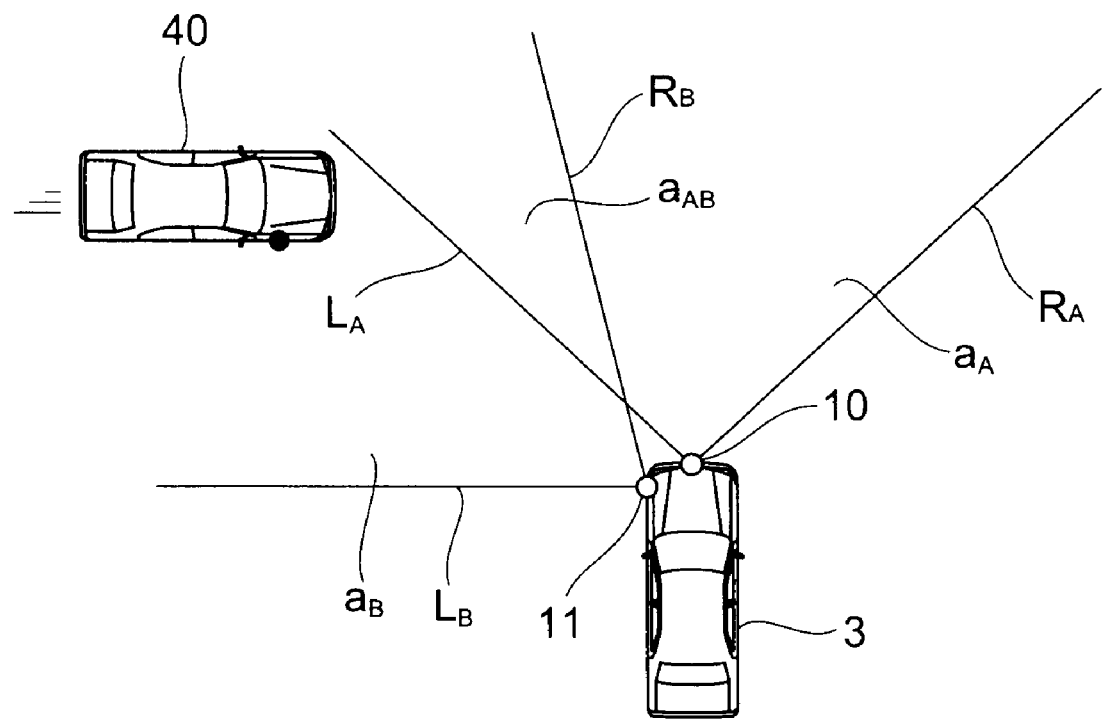
FIG. 3 is a drawing showing a positional relation of detection regions of a radar A10 located in a front part of a vehicle 3 and a radar B11 located in a front left part thereof.

Before describing a fusion process of detection results by the object detecting apparatus according to the present invention, let us specifically describe a problem to be solved in the fusion process. We consider a case where another vehicle 40 running from left to right in front of the vehicle 3 at a stop is detected by the radar A10 located in the front part of the vehicle 3 and the radar B11 located in the front left part as shown in FIG. 3. The radar A10 has a detection region defined as a region $a_A$ of a fan shape between borders $R_A$ and $L_A$. On the other hand, the radar B11 has a detection region defined as a region $a_B$ of a fan shape between borders $R_B$ and $L_B$. An overlapping region between the region $a_A$ and the region $a_B$ is a region $a_{AB}$ of a fan shape between the borders $L_A$ and $R_B$.

Figure 4:
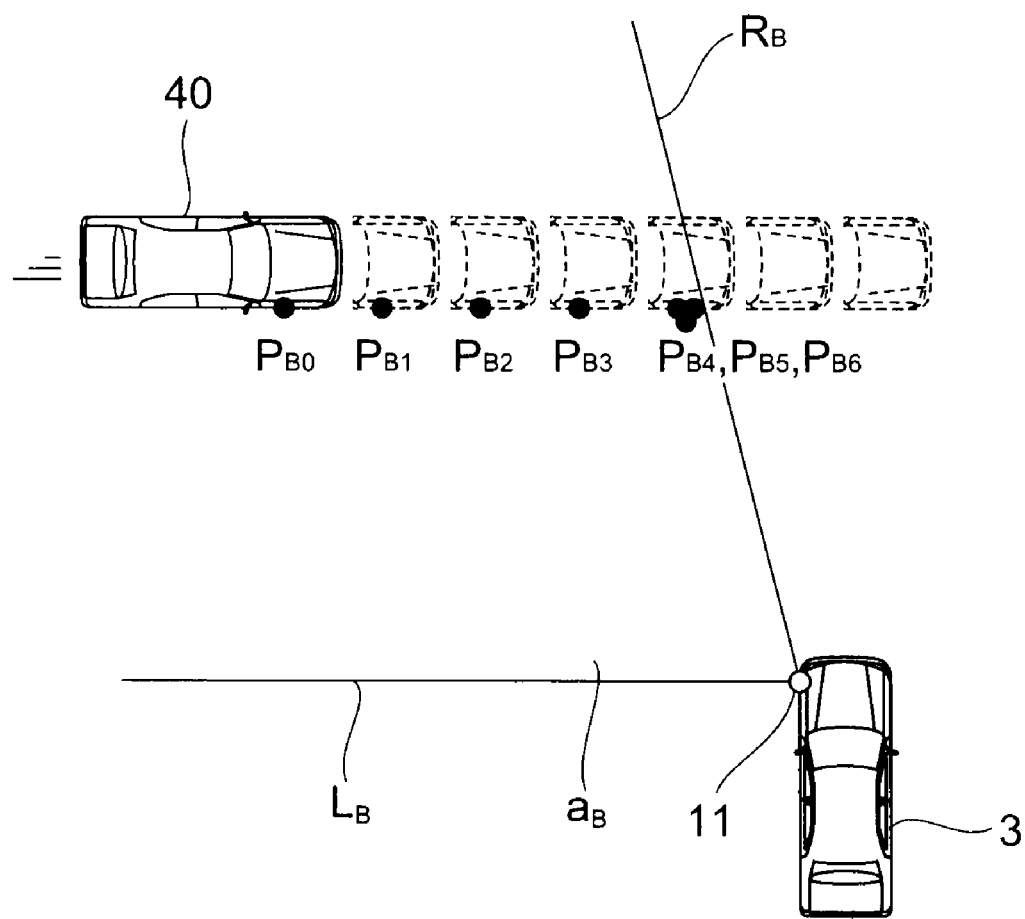
FIG. 4 is a drawing illustrating a movement situation of detected points by the radar B11 in a case where another vehicle 40 is running at a constant velocity from left to right.

In the case where the other vehicle 40 is running at a constant velocity from left to right, movement of detected points by the radar B11 is as shown in FIG. 4. $P_{B0}$-$P_{B6}$ indicate positions of detected points at constant time intervals. When the whole of the vehicle 40 is located within the detection region $a_B$ of the radar B11, a reflected wave from near the front right wheel house of the vehicle 40 has the strongest intensity and thus the detected points $P_{B0}$-$P_{B4}$ are also arranged at almost constant intervals. Thereafter, the vehicle 40 moves beyond the right border $R_B$ of the detection region $a_B$, whereupon the reflected wave detectable is only that from the part of the vehicle 40 remaining in the detection region $a_B$. Therefore, a point with the maximum intensity in the remaining part appears near the border $R_B$. As a result, $P_{B4}$-$P_{B6}$ appear at almost identical positions and the object seems as if to stay near the border $R_B$.

Figure 5:
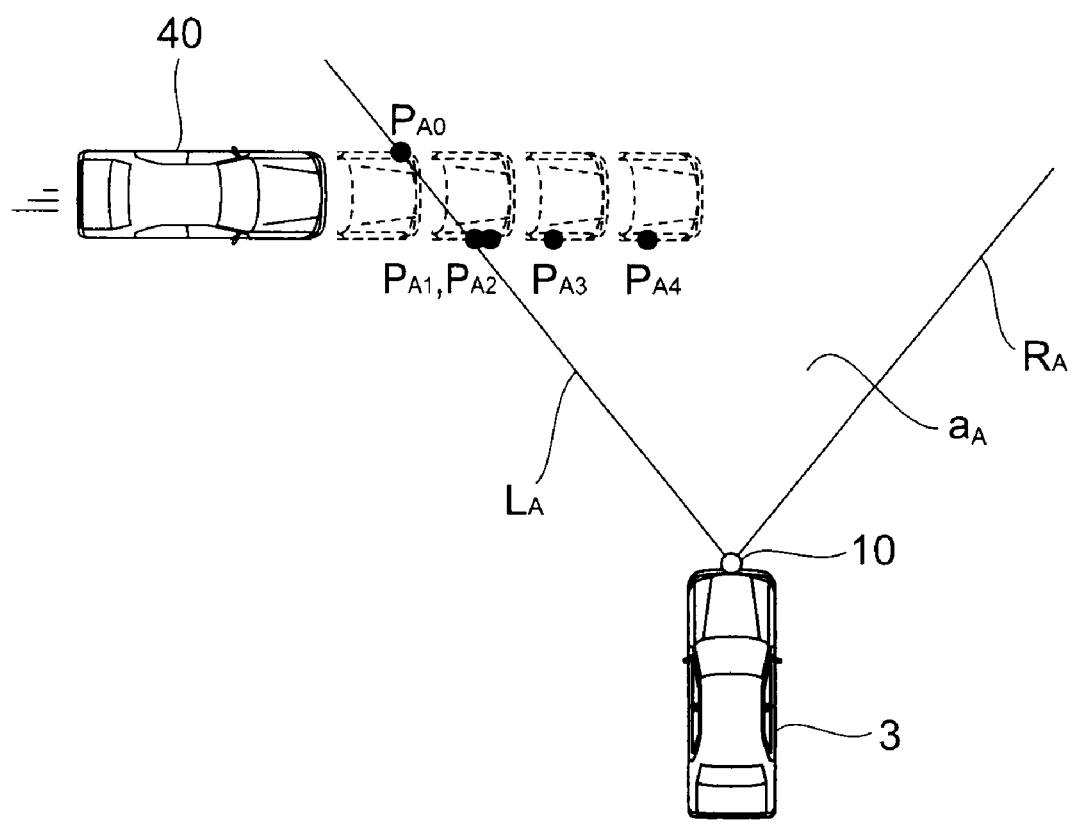
FIG. 5 is a drawing illustrating a movement situation of detected points by the radar A10 in the same case as FIG. 4.

Movement of detected points by the radar A10 in the same situation is as shown in FIG. 5. As in the case of FIG. 4, $P_{A0}$-$P_{A4}$ indicate positions of detected points at constant time intervals. It is noted that $P_{Ai}$ and $P_{Bj}$ do not indicate the same point of time when i=j. The front left corner of the vehicle 40 is the part that first moves beyond the border $L_A$ into the detection region $a_A$. A detected point at this time is denoted by $P_{A0}$. Thereafter, as the vehicle 40 moves into the detection region $a_A$, the point with the strongest intensity of the reflected wave moves from the left end to the right end along the front edge of the vehicle 40 from the front left corner of the vehicle (to detected point $P_{A1}$) and then moves along the right side face up to near the wheel house on the front right side (to detected point $P_{A2}$). After the vehicle moves into the detection region $a_A$ up to the vicinity of the wheel house on the front right side, the radar A10 continuously detects the vicinity of the wheel house and thus detected points move as indicated by $P_{A2}$-$P_{A4}$. Namely, while the vehicle 40 moves into the detection area, the detected points show the following behavior: the detected point first appears at the position $P_{A0}$, the detected points then move toward the vehicle 3 near on the border $L_A$, they temporarily stay near $P_{A1}$ and $P_{A2}$, and then they move to the right.

Figure 6:
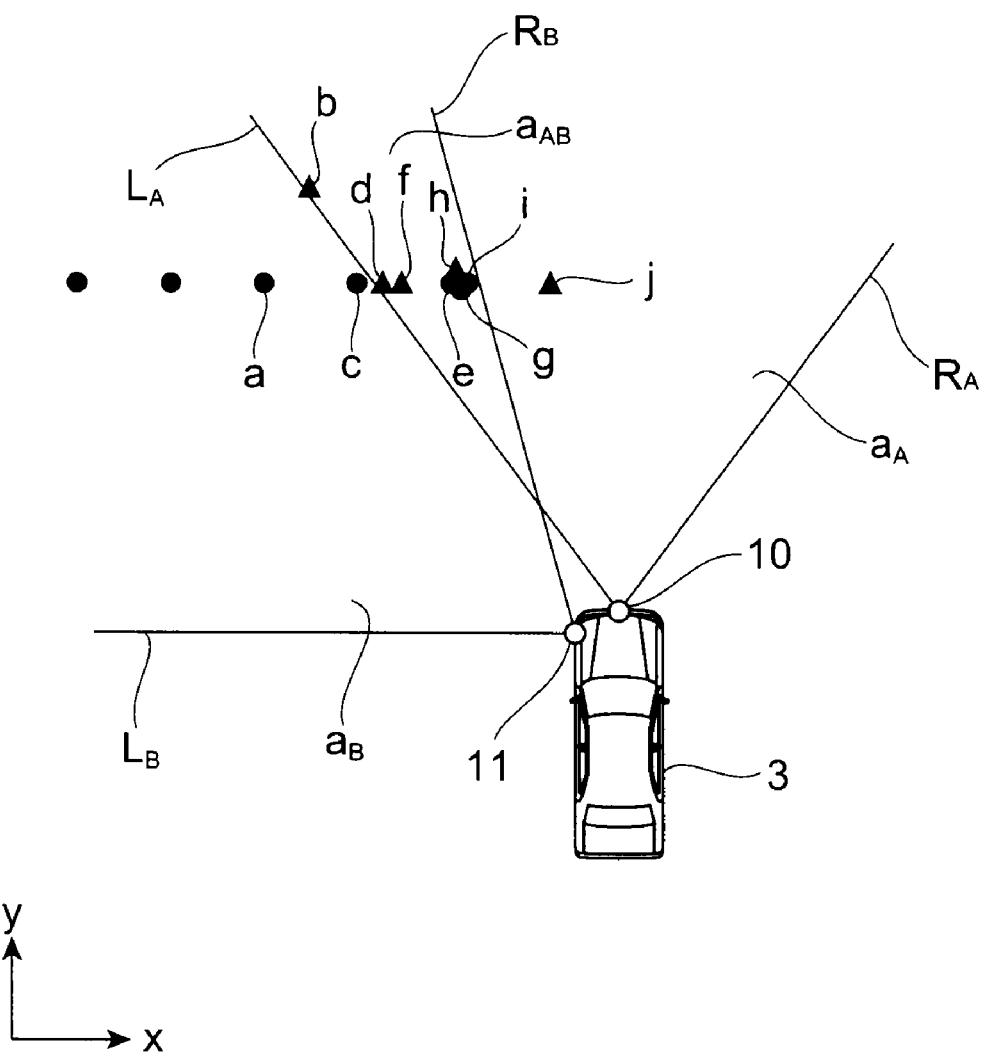
FIG. 6 is a drawing showing the detected points in FIG. 4 and FIG. 5 as superimposed.

FIG. 6 is a drawing showing the detected points shown in FIG. 4 and FIG. 5, as superimposed. Solid dots indicate the detected points by the radar B11 and solid triangles the detected points by the radar A10. Combinations of corresponding detected points with the vehicle 40 at the same position are a-b, c-d, e-f, g-h, and i-j. Among these, combinations of near positions are only c-d and g-h, and these two sets can be paired. However, the other three combinations indicate separate positions, and there is thus a possibility of making a determination of different objects. The fusion process in the object detecting apparatus according to the present invention enables the pairing even in such cases.

Figure 7:
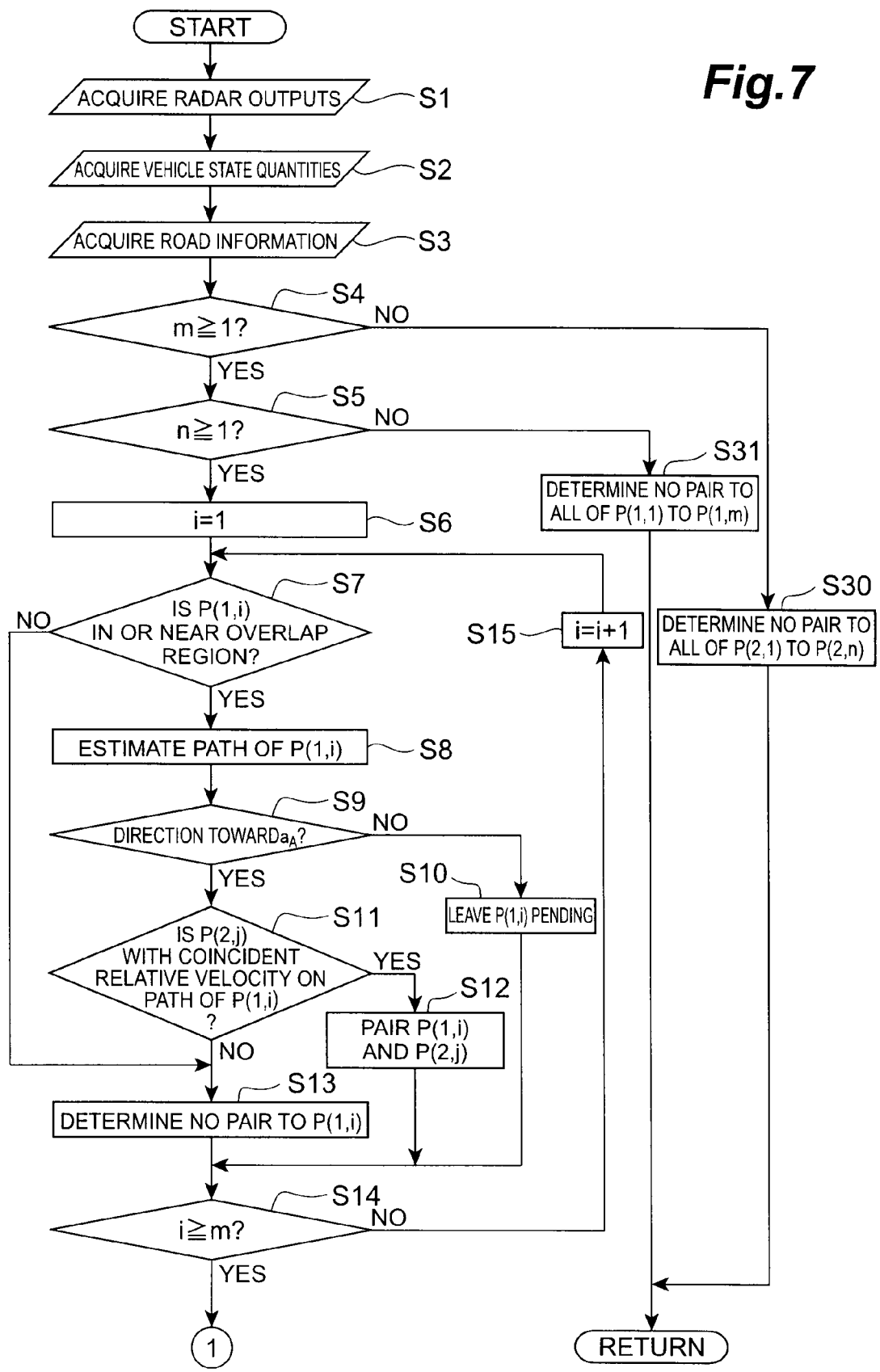
FIG. 7 is the first half of a flowchart showing an example of the fusion process in the apparatus of FIG. 1.
Figure 8:
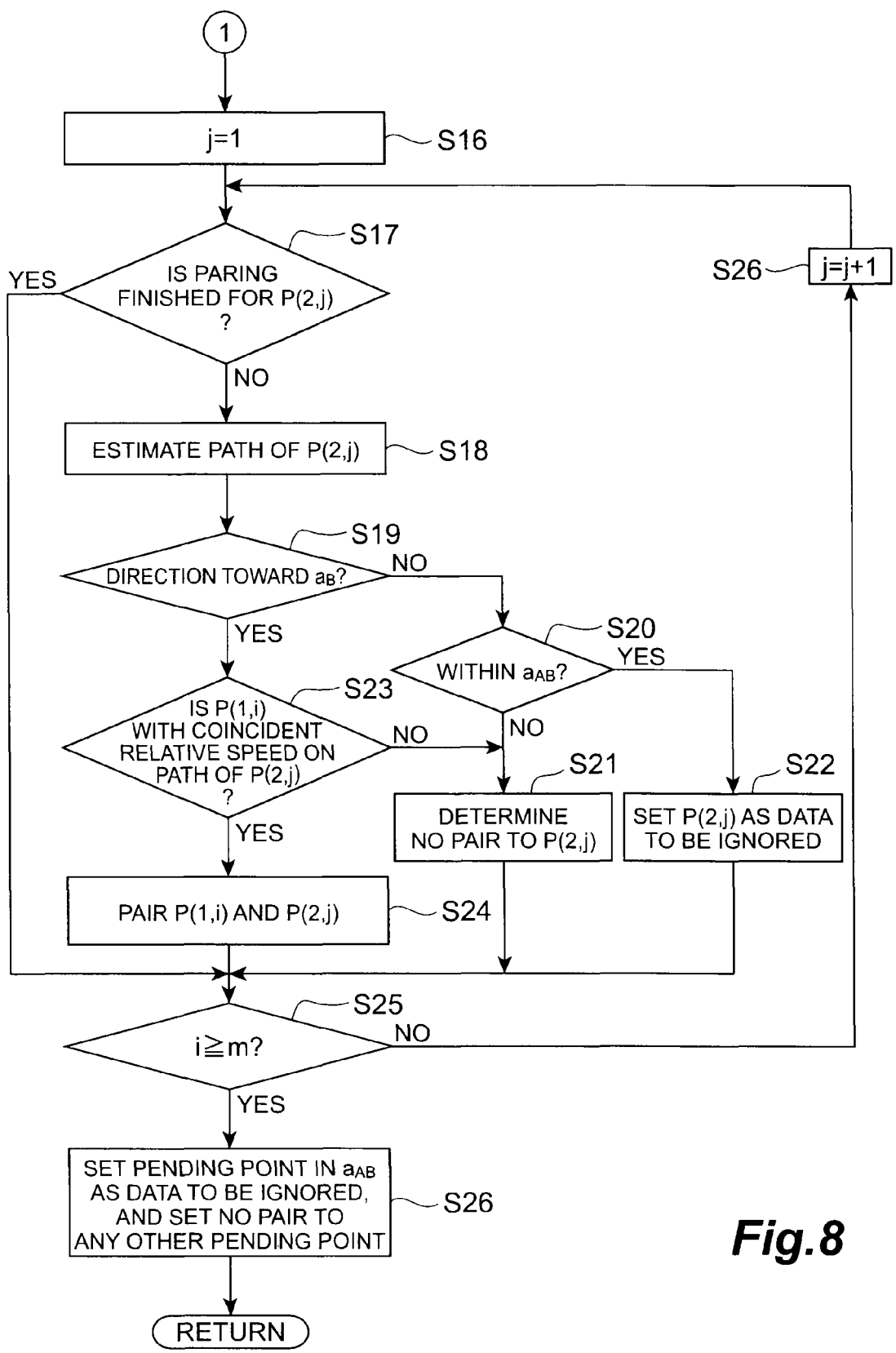
FIG. 8 is the second half of the flowchart showing the example of the fusion process in the apparatus of FIG. 1.

FIG. 7 and FIG. 8 show a flowchart of the fusion process in the present embodiment. The data processing section 2 repeatedly executes this process at predetermined timing during an on-off period of power of the apparatus (in a case where there is a switch for switching activation/deactivation of the object detecting apparatus itself, the period is a duration in which the switch is set in activation).

First, the target tracking unit 20 of the data processing section 2 acquires outputs of the radar A10 and the radar B11 (step S1) and acquires vehicle state quantities such as the vehicle speed and the yaw rate from the vehicle speed sensor 31 and from the yaw rate sensor 32 (step S2). In addition, it acquires a current position of the vehicle and road information from the navigation system 33 (step S3). The position of each detected point acquired by the radar B11 will be denoted hereinafter by P(1,i) and the position of each detected point acquired by the radar A10 by P(2,j). The number of detected points acquired by the radar B11 is denoted by m and the number of detected points acquired by the radar A10 by n.

Then the correspondence determining unit 21 determines the number m (step S4). When m is less than 1 (actually in the case of 0), it means that the radar B11 detects no object. Therefore, there is no pair corresponding to the detected points by the radar A10, and thus the processing shifts to step S30. When there are detected points (or when n is not less than 1), no pair is set to all of P(2,1)-P(2,n), and the processing is then terminated.

When m is not less than 1, i.e., when an object is detected by the radar B11, the number n is further determined (step S5). When the number n is less than 1, i.e., when the number n is 0 in fact as described above, it means that no object is detected by the radar A10. In this case, there is no detected point by the radar A10 to be paired with the detected points by the radar B11, and the processing shifts to step S31 to set no pair to all of the detected points by the radar B11, i.e., P(1, 1)-P(1,m). Then the processing is terminated. When the number n is not less than 1, i.e., when an object is detected by both of the radars A10, B11, the processing moves to step S6 and subsequent steps for determining the presence/absence of a pair and performing the pairing if necessary.

An initial value 0 is first set in variable i (step S6). It is then checked whether P(1,i) exists in or near the overlap region $a_{AB}$ (step S7). When a detected point is sufficiently apart from the overlap region $a_{AB}$ (e.g., in FIG. 6, in the case of detected points at solid dot positions on the left to point a), it can be presumed that the object itself is distant from the overlap region $a_{AB}$. In this case, the processing shifts to step S12 to set no pair to P(1,i), and then the processing moves to step S13 described below.

On the other hand, when the detected point exists in or near the overlap region $a_{AB}$, the processing shifts to step S8 to acquire estimated path information of P(1,i) obtained by the target tracking unit 20. This estimated path information can be obtained by estimating a moving direction of detected points on the basis of a movement locus obtained by temporal tracking of detected points. On that occasion, the moving direction can be accurately estimated even with a small number of tracking points, by using information such as a relative velocity obtained from a Doppler shift component.

It is next determined whether the moving direction of P(1,i) is a direction toward the inside of the detection region $a_A$ of the radar A10 or a direction away from the region $a_A$, based on the obtained estimation data of moving direction (step S9). When the moving direction is the direction away from the region $a_A$, the processing shifts to step S10 to suspend the determination of a pair, and then the processing moves to step S14 described below. The reason for it is as follows. A detected point moving in the direction away from the region $a_A$ is considered to be one moving from the inside of the region $a_A$ into the region $a_B$, and when a corresponding detected point is present among detected points by the radar A10, it is considered that the detected points by the radar A10 have been tracked for a long time. Therefore, it is preferable in terms of accuracy to perform the detection with the detected points on the radar A10 side.

On the other hand, when the moving direction is the direction toward the inside of the detection region $a_A$ of the radar A10, a search is further made for P(2,j) with a relative velocity equal to that of P(1,i) on the determined path (step S11). This path is not set as a line, but set as a region having a certain width. For example, in an example shown in FIG. 9, the path is set as a region with Y coordinates ranging from $Y_{th1}$ to $Y_{th2}$. When coincident P(2,j) is found, the processing shifts to step S12 to pair the points P(1,i) and P(2,j). On the other hand, when no coincident P(2,j) is found, no pair is set to P(1,i) (step S13).

After completion of any one of steps S10, S12, and S13, the processing moves to step S14 to compare the variable i with m. When the variable i is less than m, the pairing determination is not finished for all P(1,i) and thus 1 is added to i (step S15). Then the processing returns to step S7 to repeat the processing up to S14, thereby performing the determination process for all P(1,i).

When it is determined in step S14 that the variable i is not less than m, the processing shifts to step S16 to set an initial value 1 in variable j. Subsequently, it is determined whether the pairing of P(2,j) is finished (step S17). When the pairing is finished, there is no need for execution of the pairing determination and thus the processing shifts to step S25 described below. On the other hand, when the pairing is not finished yet, a path of P(2,j) is estimated (step S18) and it is determined whether the moving direction is a direction toward the inside of the detection region $a_B$ of the radar B11 or a direction away from the region $a_B$ (step S19).

When the moving direction is the direction away from the region $a_B$, it is further determined whether the detected position is located in the overlap region $a_{AB}$ (step S20). If the detected point is located in the overlap region $a_{AB}$, a corresponding point should normally exist in the detection region $a_B$ of the radar B11, and it must have been paired by the aforementioned processing of steps S8→S9→S11→S12. Nevertheless, the detected point is not paired, and this case is considered to be a case where the object position is not correctly detected like point b in FIG. 6. For this reason, the detected point is set as data to be ignored (step S22). On the other hand, when it is located outside the overlap region $a_{AB}$, the processing shifts to step S21 to set no pair.

On the other hand, when the moving direction is the direction toward the inside of the detection region $a_B$ of the radar B11, a search is further performed for P(1,i) with a relative velocity equal to that of P(2,j) on the determined path (which is not a line but is set as a region with a certain width) (step S23). When coincident P(1,i) is found, the processing moves to step S24 to pair the points P(1,i) and P(2,j). On the other hand, when no coincident P(1,i) is found, the processing moves to step S21 to set no pair to P(1,i).

When completion of pairing is determined in step S17, or after completion of step S21, S22, or S24, the processing shifts to step S25 to compare the variable j with n. When the variable j is less than n, the pairing determination is not finished for all P(2,j) and thus 1 is added to j (step S26). Then the processing returns to step S17 to repeat the processing to S25, thereby performing the determination processing for all P(2,j). When j is not less than n, it means that the pairing determination is finished, and thus the processing shifts to step S27.

Step S27 is to search for P(1,i) under pairing suspension. When a pending point is located in the overlap region $a_{AB}$, it is set as data to be ignored; when it is located outside the overlap region $a_{AB}$, no pair is set thereto and the processing is terminated.

Since the pairing is not carried out only in the approximate agreement case of the position and velocity, but is also performed in the case where the relative velocity is approximately coincident on the path on the tracking side, it becomes feasible to perform the pairing for c-d, e-f, and i-j shown in FIG. 6, as well. For this reason, the object can be surely tracked during movement of the object over the detection region, whereby occurrence of a lost case to lose the object can be prevented. For this reason, this process has the advantage that various controls based on tracking can be stably and quickly performed.

Figure 10:
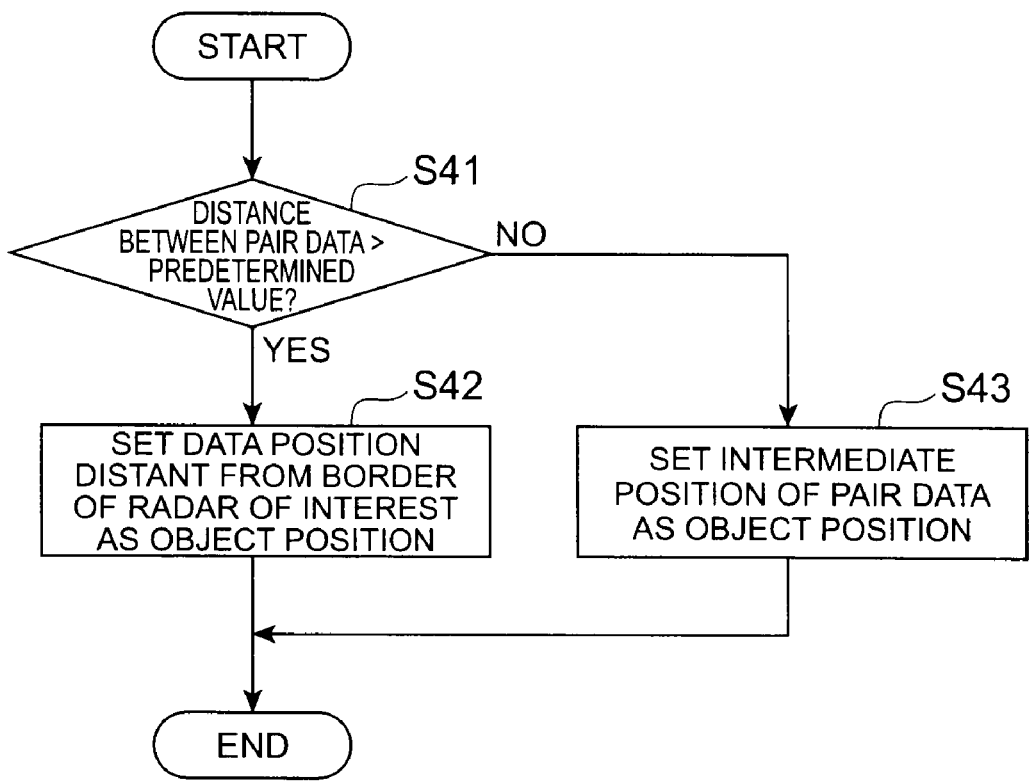
FIG. 10 is a flowchart of a process for calculating an object position from positions of detected points.

In the present embodiment, it becomes feasible to implement pairing between detected points at distant positions. On the other hand, the positions of paired detected points are not always equal to a representative position of the object, different from the pairing case for only approximately equal positions, and it is thus necessary to set the representative position of the object on the basis of the positions of the detected points. FIG. 10 is a flowchart of a process for calculating an object position from positions of detected points as in this case.

First, a distance between pair data is compared with a predetermined value (threshold) (step S41). When the distance is larger than the predetermined value, the processing shifts to step S42 to set a data position apart from a border of a radar of interest, as an object position. A specific example will be described by i-j in FIG. 9. Since point i is a point detected by the radar B11, a distance $d_i$ from the border line $R_B$ of the radar B11 on the radar A10 side to point i is set as a distance from the border of the radar of interest. On the other hand, since point j is a point detected by the radar A10, a distance $d_j$ from the border line $L_A$ of the radar A10 on the radar B11 side to point j is set as a distance from the border of the radar of interest. Since $d_j > d_i$, point j is set as an object position.

On the other hand, when the distance between pair data is smaller than the predetermined value, the processing shifts to step S43 to set an intermediate position of the pair data as an object position. In the example shown in FIG. 9, the combinations of c-d and g-h fall into this case.

Figure 11:
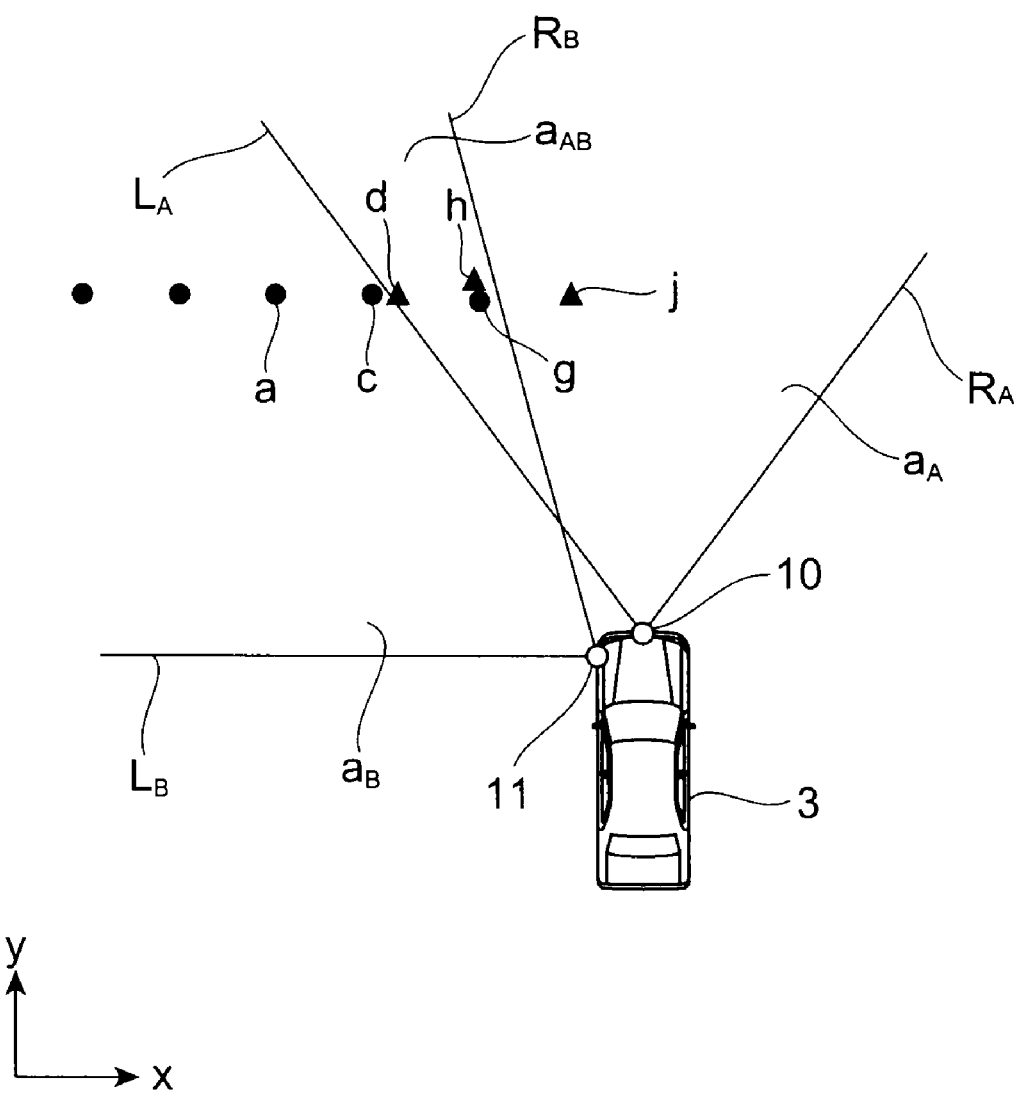
FIG. 11 is a drawing showing data selected from pair data by a selection process in FIG. 10.

The above described the example in which the object position was specified as one location, and it is also possible to adopt the following method: when the distance between pair data exceeds the predetermined value, a selection process is performed so as to exclude data whose distance from a border position of the radar of interest on the other radar side is within a predetermined distance. FIG. 11 shows data selected by this selection process from the pair data shown in FIG. 6 and FIG. 9. Points e, f, and i are further excluded from the paired data in FIG. 9. In FIG. 11, the selected points, a, c-d, g-h, j, are arranged at almost equal intervals and accurate tracking can be performed without staying of any detected point. Since with movement of the object the detected points move from the state of detection by only the radar B11 (point a) through the state of detection by both of the radar A10 and radar B11 (points c-d and g-h) to the state of detection by only the radar A10 (point j), it is feasible to surely perform a handover of information on the object moving over the region.

Figure 9:
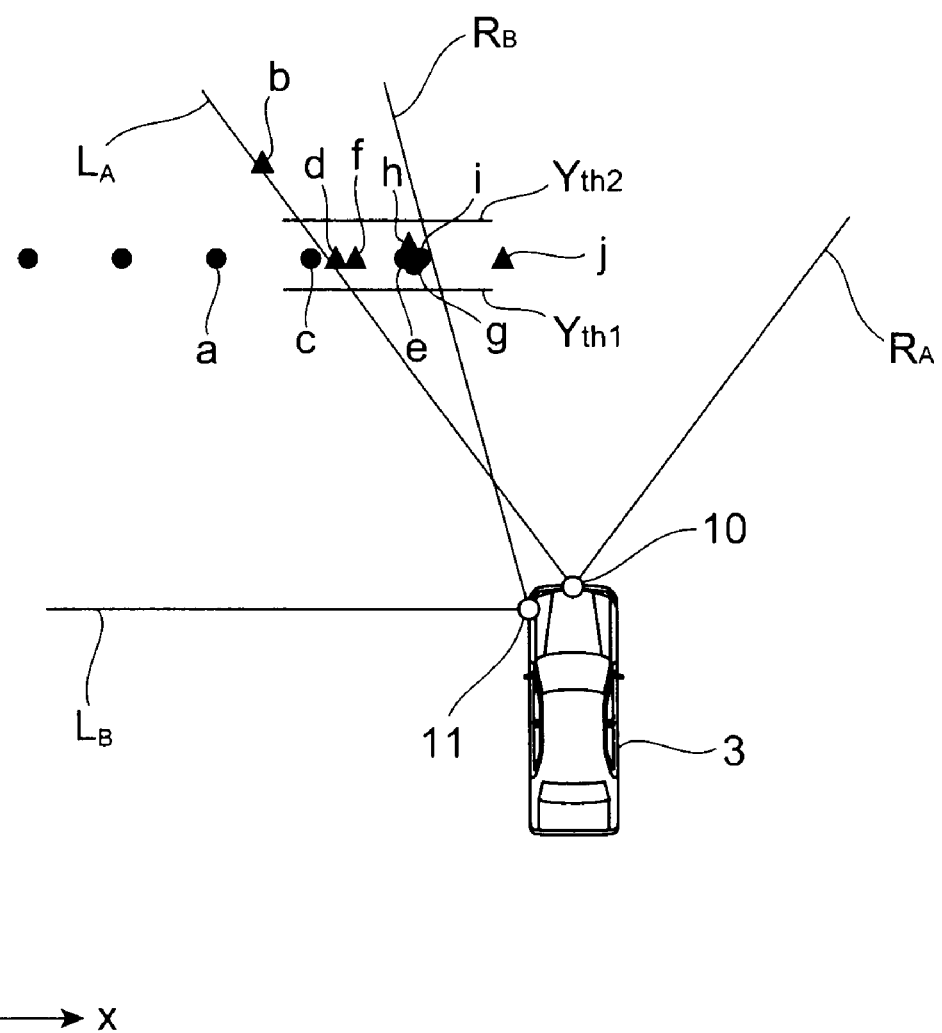
FIG. 9 is a drawing illustrating a pairing technique.

The above described the example of pairing in the case where a pair was made if a detected point by the other radar existed on an estimated path of a detected point under tracking, but techniques of pairing are not limited to this method. In FIG. 9, when the object moves from the inside of the detection region $a_B$ of the radar B11 into the detection region $a_A$ of the radar A10, the first detected point by the radar A10 appears near the border line $L_A$ on the detection region $a_B$ side. It appears as data as if it goes into the region from the border line $L_A$. Therefore, a correspondent point can be determined to be a detected point appearing in a region with a predetermined width determined from a moving path determined from the detection result of the radar B11, in the region near the border line $L_A$. Points away from the foregoing region are handled by the tracking process from the region. In FIG. 9, where there is a detected point (point d) appearing in the region near $L_A$ within the region having the width of $Y_{th1}$-$Y_{th2}$, it is paired and movement thereof is tracked. This method also permits the apparatus to accurately track an object moving over the detection region.

Figure 12:
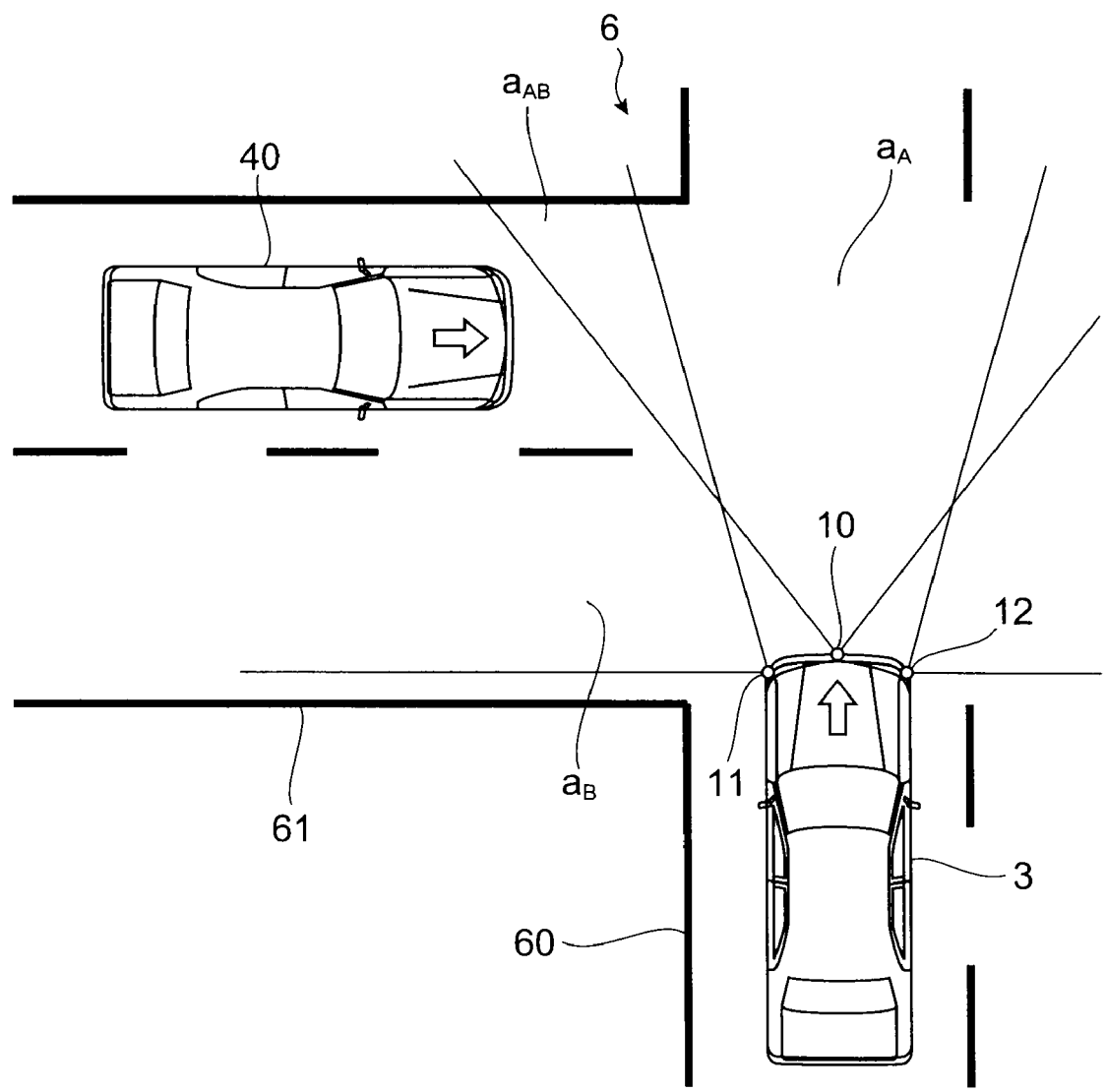
FIG. 12 is a drawing illustrating detection of an approaching vehicle at an intersection 6.

Some specific examples of utilization of the tracking result will be described below. FIG. 12 is a drawing to illustrate detection of an approaching vehicle at an intersection 6. The host vehicle 3 is at a stop before the intersection 6 on a road 60 and another vehicle 40 is approaching from the left on an intersecting road 61. When the object detecting apparatus of the present embodiment is used to detect this approaching vehicle, it is able to surely track the vehicle 40 during movement thereof from the detection region $a_B$ by the radar 11 to the detection region $a_A$ by the radar 10. For this reason, the approaching vehicle 40 is prevented from being lost near the overlap region $a_{AB}$.

In cases where a driver is given a warning of approach of the vehicle 40 or where a control is performed so as to avoid a collision, a condition for initiation of the control is that an obstacle or the like is continuously detected for a certain period of time, in order to prevent a warning error or a control error. Since in the control using the present embodiment the vehicle 40 is also continuously detected during crossing of the overlap region $a_{AB}$, there is no delay of reaction even to an obstacle in and near the overlap region $a_{AB}$, so as to improve safety and controllability.

Figure 13:
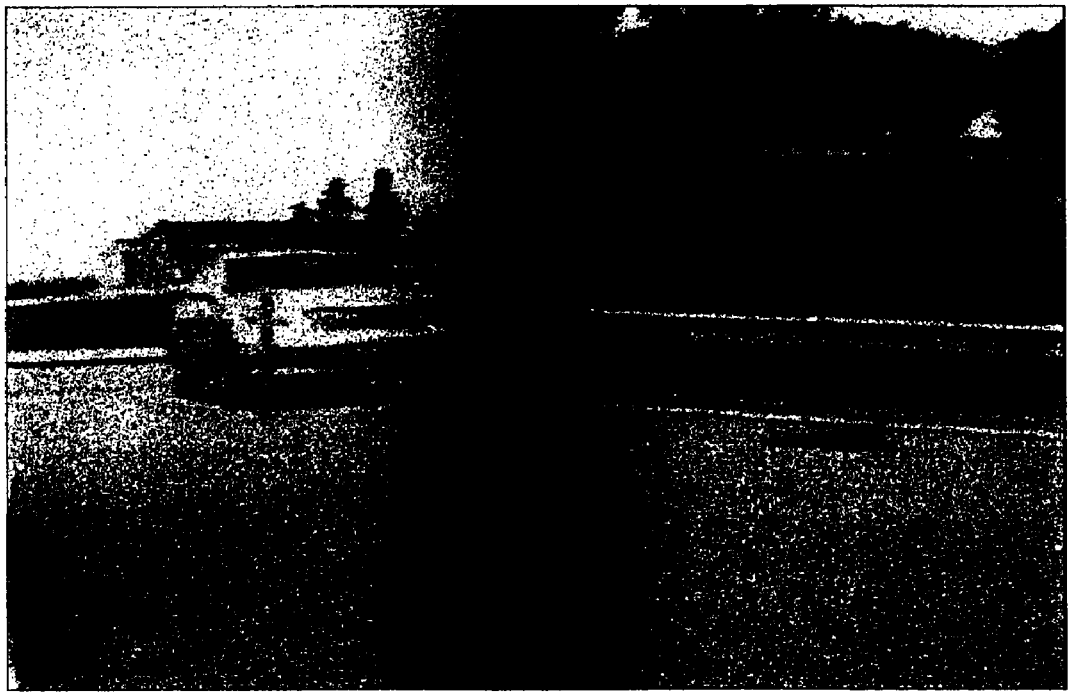
FIG. 13 is a drawing showing an image example of a blind-spot display camera.

FIG. 13 is an image example of a display device which displays a detected point by a radar as superimposed on images taken with a plurality of cameras. In this example, cross hairs are shown as a detection result of the radar as superimposed on a vehicle in an image. The center black part is a blind-spot region of the cameras. For example, in a case where the blind-spot region overlaps with an overlap region of radars, an object (vehicle) cannot be tracked in the blind-spot portion unless the pairing is well done in the overlap region. In contrast to it, since the present embodiment achieves the improvement in the accuracy of pairing, the vehicle can be tracked even in the blind-spot region, so as to improve safety.

Figure 14:
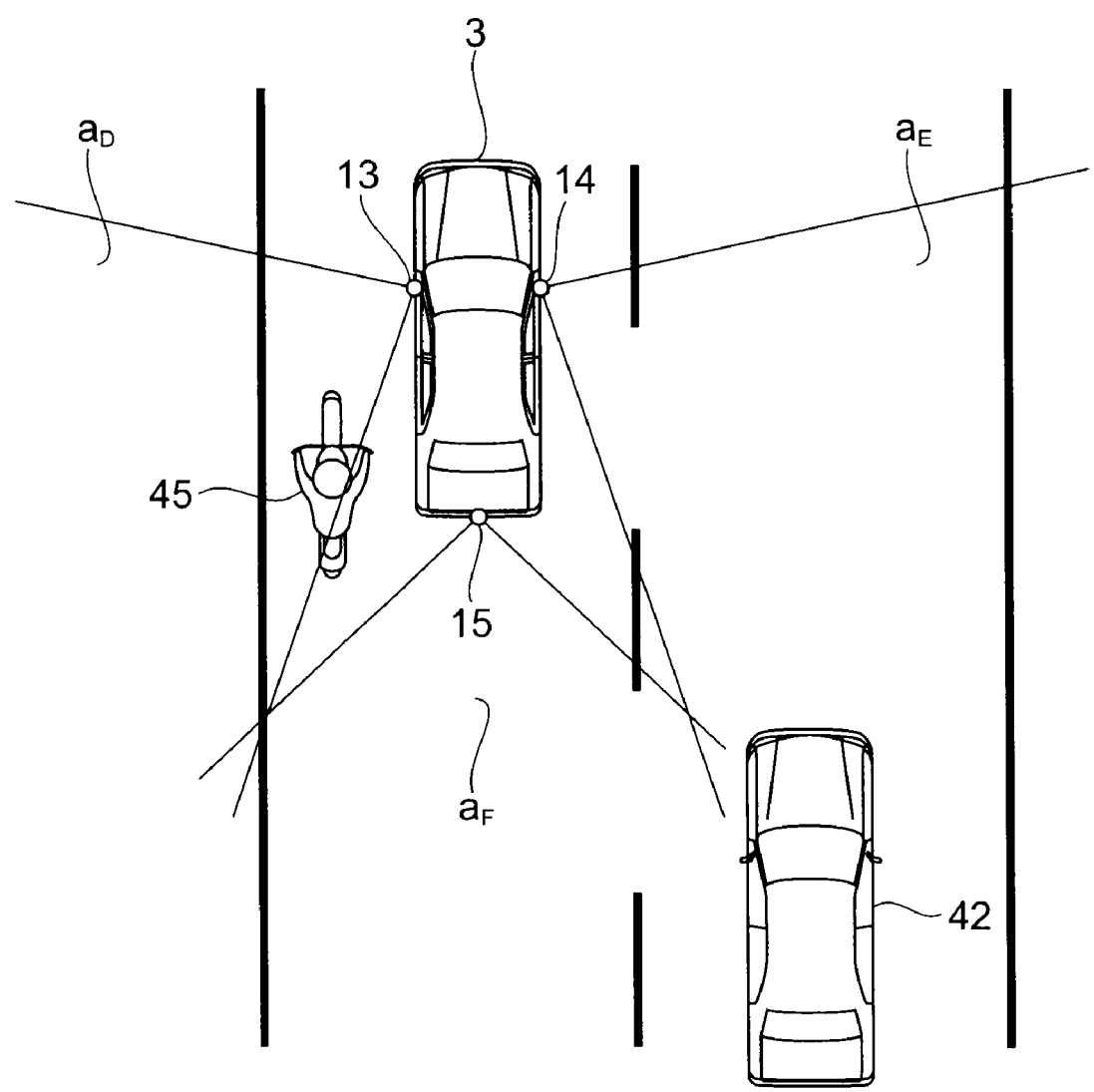
FIG. 14 is a drawing showing a positional relation with a parallel-running vehicle and others.
Figure 15:
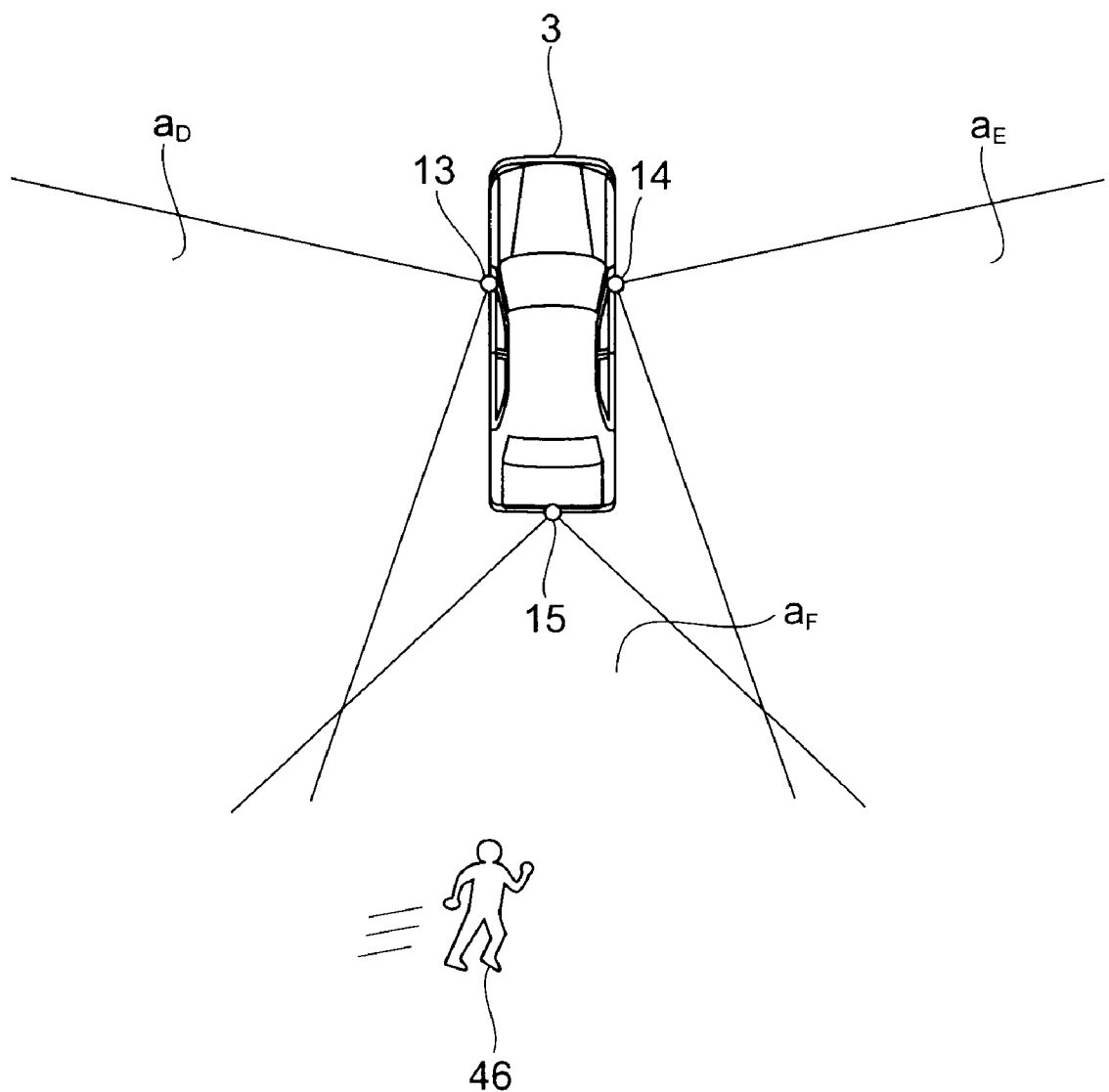
FIG. 15 is a drawing showing a positional relation with a pedestrian running out into a moving path during a reverse run.
Figure 16:
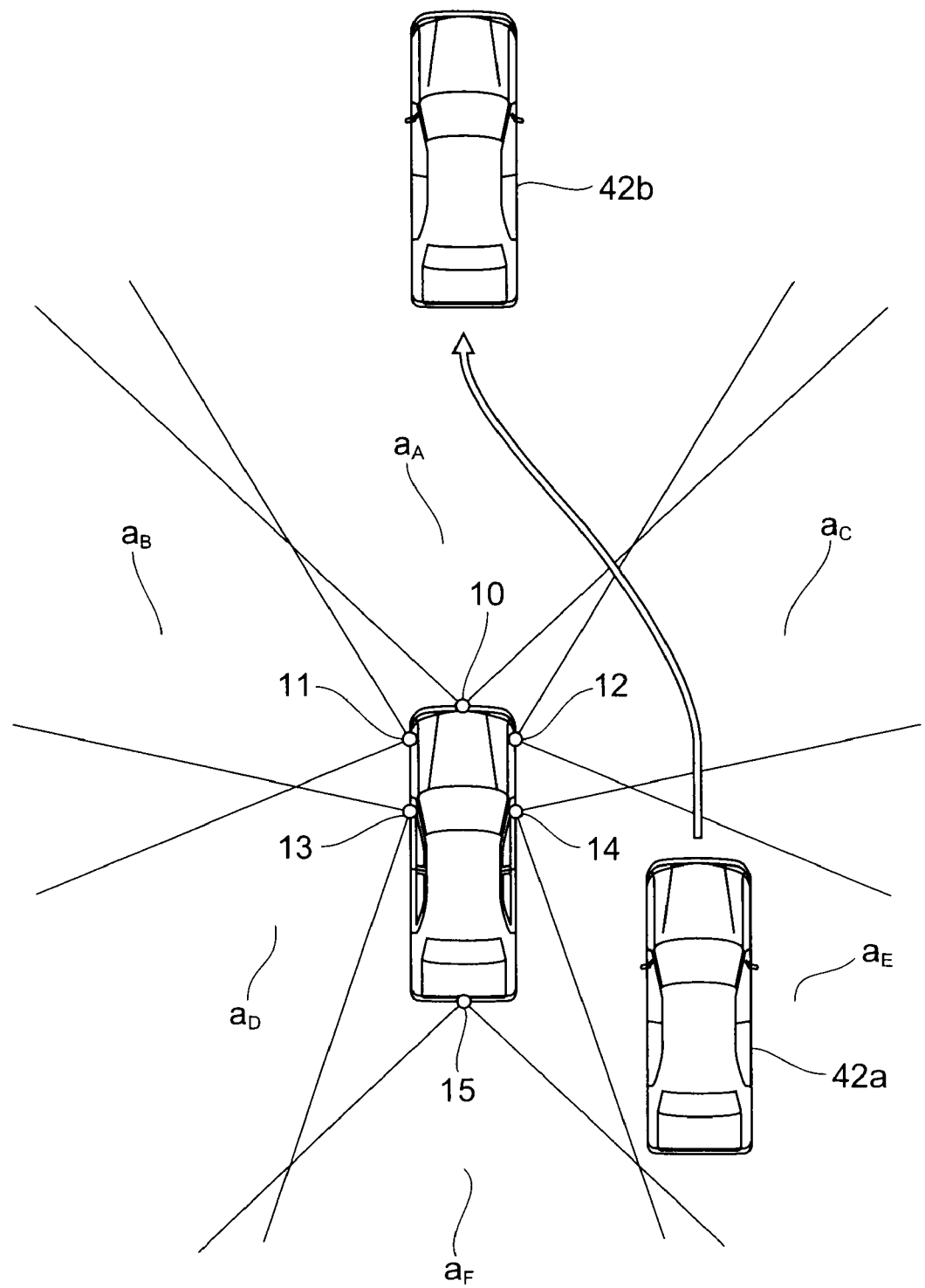
FIG. 16 is a drawing illustrating a positional relation with an overtaking vehicle.

Furthermore, any target object passing through the overlap region can be tracked without being lost, e.g., another vehicle 42 approaching from the back and a bicycle 45 passing from the back and by its side (cf. FIG. 14), a pedestrian 46 running out into a moving path during a reverse run (cf. FIG. 15), and another vehicle overtaking the host vehicle 3, 42a→42b (cf. FIG. 16), and thus various controls can be initiated quickly.

There is no need for providing an excessive overlap region between adjacent radars in arrangement of radars and there is no need for setting an exact center position of each radar in accordance with a control target; therefore, the present invention also has the advantages that in use of narrow-range radars the number thereof can be reduced and degrees of freedom for arrangement of radars increase.

INDUSTRIAL APPLICABILITY

The present invention improves the detection accuracy of an object through the use of a plurality of radars having an overlap detection region.

The invention claimed is:

1. An object detecting apparatus comprising:
a first radar that receives a reflected wave from an object as reflection of a transmitted wave sent out, to detect a position of the object and a relative velocity between the apparatus and the object;
a second radar arranged so that a detection region thereof overlaps in part with a detection region of the first radar, and adapted to receive a reflected wave from an object as reflection of a transmitted wave sent out, to detect a position of the object and a relative velocity between the apparatus and the object; and
a data processing section that sets a range for a moving path of the object, based on the position of the object and the relative velocity detected by one of the first and second radars, and, when the position of the object detected by the other of the first and second radars is included in the range and there is agreement between the relative velocities detected by the first and second radars, determines that the object detected by the first radar is identical with the object detected by the second radar,
wherein the range set for the moving path of the object, based on the position of the object, is a region within a predetermined width from an estimated movement locus of the object, in the vicinity of a border position of the detection region on the other radar side.

2. The object detecting apparatus according to claim 1, wherein the first radar and the second radar are arranged to output as an object position a position where the reflected wave from the object has a maximum reflection intensity.

3. The object detecting apparatus according to claim 1, wherein each of the first radar and the second radar is a radar for sending out a transmitted wave to the object and for receiving a reflected wave thereof to detect a position of the object.

4. The object detecting apparatus according to claim 1, which is mounted on a vehicle and adapted to detect an obstacle around the vehicle.

5. An object detecting method comprising:
receiving a reflected wave from an object as reflection of a transmitted wave sent out, to detect a position of the object and a relative velocity between the apparatus and the object by a first radar;

receiving a reflected wave from an object as reflection of a transmitted wave sent out, to detect a position of the object and a relative velocity between the apparatus and the object by a second radar being arranged so that a detection region thereof overlaps in part with a detection region of the first radar;

setting a range for a moving path of the object, based on the position of the object and the relative velocity detected by one of the first and second radar; and determining that the object detected by the first radar is identical with the object detected by the second radar, when the position of the object detected by the other of the first and second radar is included in the range and there is agreement between the relative velocities detected by the first and second radars, wherein the range set for the moving path of the object, based on the position of the object, is a region within a predetermined width from an estimated movement locus of the object, in the vicinity of a border position of the detection region on the other radar side.

6. The object detecting method according to claim 5, wherein the first radar and the second radar are arranged to output as an object position a position where the reflected wave from the object has a maximum reflection intensity.

7. The object detecting method according to claim 5, wherein each of the first radar and the second radar is a radar for sending out a transmitted wave to the object and for receiving a reflected wave thereof to detect a position of the object.

8. The object detecting method according to claim 5, which is adapted to detect an obstacle around the vehicle.

* * * * *